US007220950B2

(12) United States Patent
Gruenspecht et al.

(10) Patent No.: US 7,220,950 B2
(45) **Date of Patent: *May 22, 2007**

(54) RF WELDING DEVICE

(75) Inventors: Mark Gruenspecht, 2432 Clubside Ct., Palm Harbor, FL (US) 34683; Timothy Hopper, Long Beach, NY (US)

(73) Assignee: Mark Gruenspecht, Largo, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/338,026

(22) Filed: Jan. 24, 2006

(65) Prior Publication Data

US 2006/0169676 A1 Aug. 3, 2006

Related U.S. Application Data

(63) Continuation of application No. 10/930,641, filed on Aug. 31, 2004, now Pat. No. 7,012,232.

(51) Int. Cl.
*H05B 6/50* (2006.01)
*B23K 13/02* (2006.01)

(52) U.S. Cl. ...................... 219/765; 219/767; 219/779; 156/274.4; 156/380.4

(58) Field of Classification Search ........ 219/764–769, 219/778–780; 156/272.2–275, 379.6–380.8
See application file for complete search history.

(56) References Cited

U.S. PATENT DOCUMENTS

| | | | | |
|---|---|---|---|---|
| 3,431,380 | A * | 3/1969 | Butler et al. | 219/769 |
| 3,721,920 | A * | 3/1973 | Mann | 219/779 |
| 3,783,217 | A * | 1/1974 | Brown | 219/776 |
| 7,012,232 | B1 * | 3/2006 | Gruenspecht et al. | 219/765 |

* cited by examiner

*Primary Examiner*—Philip H. Leung
(74) *Attorney, Agent, or Firm*—Jordan and Hamburg LLP

(57) ABSTRACT

An RF welder is disclosed that has circuitry that automatically affects system impedance so that, throughout the welding or embossing cycle, a generator is capable of sending energy through die and fabric at a predetermined frequency and cabling is capable of dissipating a load that is less than a preselected amount.

9 Claims, 5 Drawing Sheets

RF WELDING DEVICE

This is a Continuation, of application Ser. No. 10/930,641 filed Aug. 31, 2004, now U.S. Pat. No. 7,012,232.

BACKGROUND OF THE INVENTION

The present invention relates to packaging machines, and more particularly relates to sealers used in horizontal form, fill, and seal packaging machines.

Machines that utilize Radio Frequency as the means for welding (RF Welders) are known in the art. RF welders are typically used for sealing and embossing appliqué on RF sealable materials. Such materials are commonly used in processing materials such as PVC, PU, PET, PETG and polyolefin. The welders process these materials in manufacturing, for example, vinyl envelopes and binders having internal pockets. For example, pockets are sealed to the binder on first and second side edges and a bottom edge, leaving a top edge open for egress. RF welding of the edges obviates the need for stitches.

The theory and implementation of RF welding is disclosed in U.S. Pat. No. 5,833,915, incorporated herein by reference. FIG. 2 discloses an RF welder 1 known in the art. A standard generator (not shown) provides power to the welder 1 at an FCC mandated frequency of 27.12 MHz, using standard 50 Ohm coaxial cable 2. The coaxial cable is used because it is an excellent transmitter of energy and suffers very little loss.

Referencing FIG. 2, the welder 1 has a top plate 3 and a bottom plate 4 that are used as electrodes for transferring electrical energy through a subject material 5 and die 6, where the die 6 has impressions 7 used for embossing or welding.

The die 6 is attached to the top plate 3 and acts as an electrode in tandem with the top plate 3. The die 6 has conductive electrical characteristics which alter the load characteristics of the system. The material 5 is non-metallic and acts as a dielectric, absorbing energy passed between the top and bottom plates 3 and 4, to emboss of weld the material 5. The dielectric characteristics of the material 5 also alter the electrical characteristics of the system.

Accordingly, the impedance of the system is a combination of the impedance of all of the components in the electrical conduction loop plus the material being processed. Since the impedance varies from part to part and during the welding process, optimum power is not delivered to the weld with a manually fixed impedance match. If the matching network automatically varies to maintain the correct impedance at the generator, maximum power is always delivered to the weld during processing giving a better, quicker and more efficient weld.

If not enough energy passes through the system the material 5 may not weld or fail to become embossed. If too much energy passes through the system the material may burn and other system components may fail (such as the coaxial cable which can be over-dissipated).

If the frequency at which energy passes through the material is incorrect, the welding or embossing of that material will suffer lagging or leading, which is known to provide poor quality results. More specifically, the power that transfers through the fabric may rise continuously through the weld cycle, or the power may rise to a maximum value and fall as the die sinks into the material. Such a power fluctuation provides an uneven weld with potential undesirable results in, for example, weld strength or emboss appearance.

Accordingly, with differing system impedance characteristics, a result of changing system impedance, there may be a slow reaction by the fabric causing a slow start of the welding or embossing or a complete failure to weld or emboss the material. Other problems include flashing caused by a high voltage arc-over.

As a result of the unique impedance characteristic, the RF welder must be electrically tuned, via impedance matching, after placement of the die 6 and material 5 within the welder. After the tuning of the system impedance the power delivered will be optimum and over-dissipation of the cables and other elements will not occur. Energy will be passed through the platen and fabric at frequency of 27.12 MHz, preventing lagging or leading of the welding or embossing process.

Normally, impedance matching occurs as illustrated in FIG. 4. As indicated, the die and material must first be installed on the machine at S1 and S2. The user is capable of adjusting the system impedance by manually adjusting a capacitor external to the generator at S3. The capacitor is adjusted by attempting to weld a material while adjusting capacitor electrodes towards or away from a sample dielectric. The system is calibrated by running the system and checking the material at S4 and S5 to determine if the quality is satisfactory at S6.

When the material welds appropriately, it is deduced that the system is tuned properly, the power is set correctly, and over-dissipation does not occur. Once the system is tuned, a series of identical materials can be welded or embossed at steps S7 and S8.

Various problems normally occur with the manual adjusting of the capacitor. First, it is relatively impossible for a person to adjust the capacitance so that the generator sees exactly 50 ohms due to the inherent sensitivity and robustness of the system. Rather, manual adjusting typically provides at least a 5% error on the frequency adjustment. Also, a sample does not capture the dielectric characteristic for a series of materials since each individual piece of material has unique inconsistencies which affect the electrical characteristics of each weld. To adjust for these problems, the system must constantly be checked for quality at S9. Further, if non-identical materials or dies are used, then the system must be continuously retuned.

Even if the impedance is adjusted for each unique material 5, the material capacitance tends to falloff as the die sinks into the material. As the die sinks the capacitance increases, impedance changes, and optimum power is not transferred to the die and material. Accordingly, the falloff causes a decrease in the ability for the die to weld or emboss the material. Currently, there is no means for dynamically tuning the frequency of the system as a result of the dynamic material falloff

BRIEF SUMMARY OF THE INVENTION

It is the object of the invention to supply an RF welder that has circuitry which automatically tunes the impedance of the system so that when welding occurs the same power is applied to the die and material in a consistent manner ensuring that over-dissipation does not occur to material, dies, or system components.

An RF welder is disclosed that has circuitry that automatically tunes the impedance of the die and material so that the generator is capable of continuously providing a predetermined amount of power.

BRIEF DESCRIPTION OF THE DRAWINGS

Accompanying the specification are figures which assist in illustrating the embodiments of the invention, in which.

DETAILED DESCRIPTION OF THE INVENTION

Figure 1:
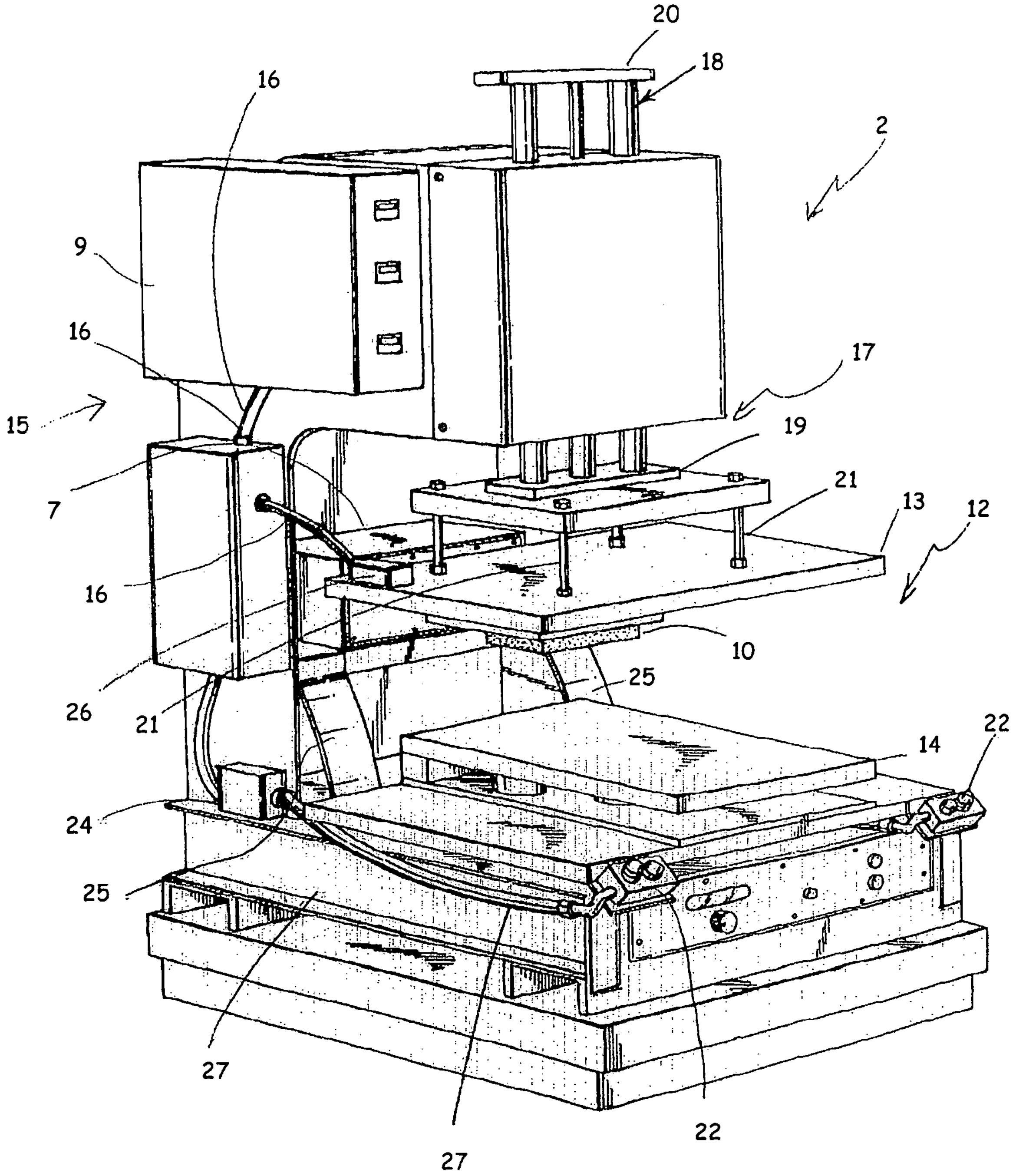
FIG. 1 is a perspective view of the RF Welding Machine.

Turning to FIG. 1, an RF welder 6 is disclosed that has circuitry 7 and software that automatically tunes the impedance of the die 10 and material 11 (FIG. 3) to match that of a solid state generator 9. The tuning enables a maximum power transfer through the material 11.

Remaining with FIG. 1, the RF welder has welding components 12 that include a top platen or plate 13 and bottom plate 14. Each plate 13 and 14 is manufactured from an electrically conductive material and is adapted to act as an electrode for the RF a dielectric heating system. Each plate 13 and 14 is in communication with the high frequency RF generator 9 so that the top plate is electrically hot and the bottom plate serves as an electric ground.

Figure 3:
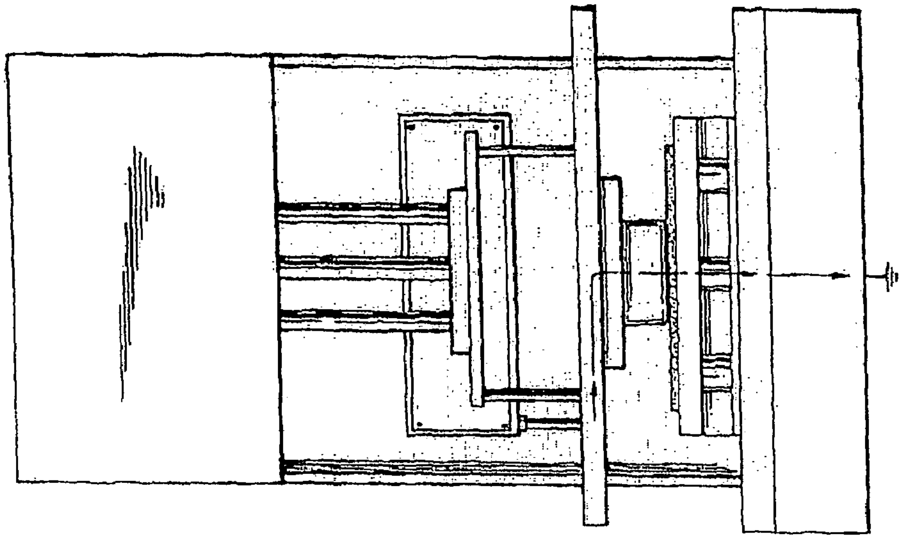
FIG. 3 is a front view of the RF Welding Machine with the top plate engaging the bottom plate and the generator activated.
Figure 2:
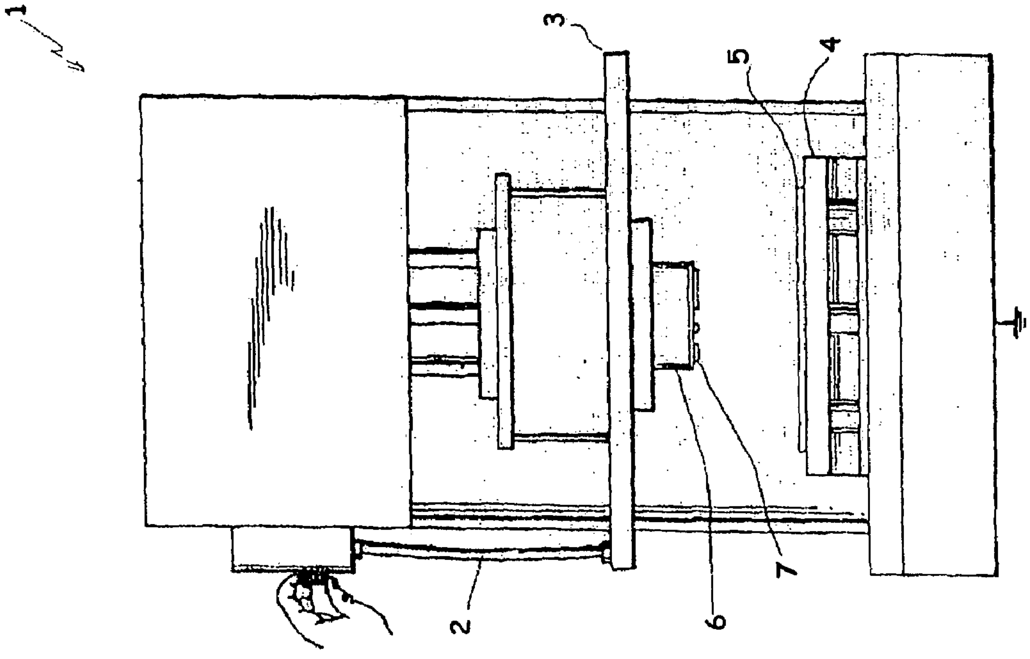
FIGURE 2 (PRIOR ART)
FIG. 2 is a front view of the RF Welding Machine according to the prior art.
Figure 4:
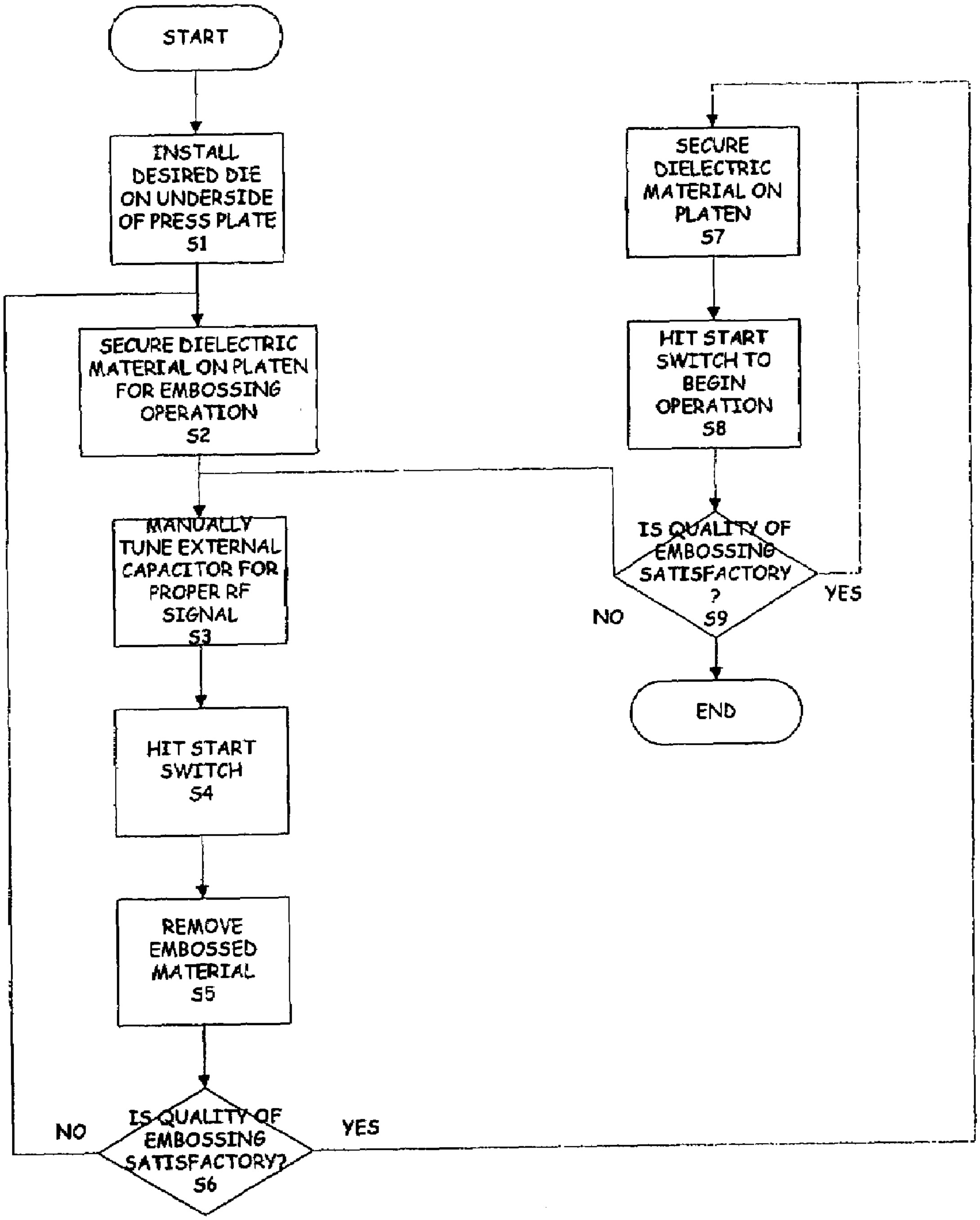
FIGURE 4 (PRIOR ART)
FIG. 4 is a schematic illustration of the method of operating the RF Welding Machine according to the prior art.

The thickness of each plate is sufficient to prevent flexing or fatiguing of the plates by periodic loading of the plates. The top plate 13 is adapted to receive energy from the generator 9 and, as illustrated in FIG. 3, the bottom plate 14 is adapted to ground energy traveling from the top plate 13 through a conductive base 27. The plates 13 and 14 are parallel to each other and large enough to fit the die 10 and work piece 11.

The lower plate 14 is a stationary base. The upper plate 13 is movable between an opened or home position and a closed or press position. The opened position spaces the upper plate from the lower plate so that the die 10 can be changed and material 11 can be fed.

The upper plate 13 is indirectly mounted to a plurality of platen arms 18 that move perpendicular to the pressing surface of the plate 13. The rate of motion of the plate arms 18 is relatively slow to minimize the injury risk upon inadvertent operator contact with the plate.

The range of motion for the top plate 13 is defined by the range of motion for the plate arms 18. The arms 18 are provided with a bottom plate 19 which defines the top range of motion and a top plate 20 which defines the bottom range of motion. The bottom range of motion, with the absence of the usable die 10, is 0.010 inches from the top face of the bottom plate 14. The separation minimum prevents the plates from buckling when power is transferred during operation. The die 10 and diectic material 11 further limit the range of bottom motion that is reachable by the top plate 13 by creating a separation barrier between the top and bottom plates 13 and 14.

Between the arms 18 and the top plate 13 are four spacers 21. Each spacer 21 is parallel to and the same length as each other spacer. Each spacer is manufactured from a non-conductive material which prevents the power from the generator 9 from being transferred to arms 18.

The electrical control of the arms 18 is achieved through known techniques, such as those defined in U.S. Pat. No. 2,993,3600 incorporated herein by reference. After the press has been actuated by the operator, the operation of the press elements is coordinated via cam-operated micro-switches and limit switches at the ends of the strokes of the various reciprocating components. Alternatively, strain gauges are located in each spacer 21. The registered strain determines the maximum downward travel of the top plate 13.

The arms 18 are advanced and retracted, to advance or retract the top plate 13, with the use of activation switches 22. The switches are powered through cabling 23 that receives power from a standard electrical current, such as a 120 volt wall current, fed through a transformer 24.

Turning again to FIG. 3, advancing the top plate 13 maintains pressure on the die 10 for purposes of completing the embossing or welding of the material. The pressure is maintained for a period of time sufficient to insure both that the material properly fills the die cavity so that the desired overall outer shape is achieved, and so that the complete formation of the embossed indicia is obtained. Dwell times for the press will be on the order of 0.1–5.0 seconds, preferably 1.0 to 3.0 seconds.

As compared to manually retracting the top plate 13, a timing relay switch maybe used for controlling the period of the application of the dielectric sealing current in accordance with the materials being added.

Figure 6:
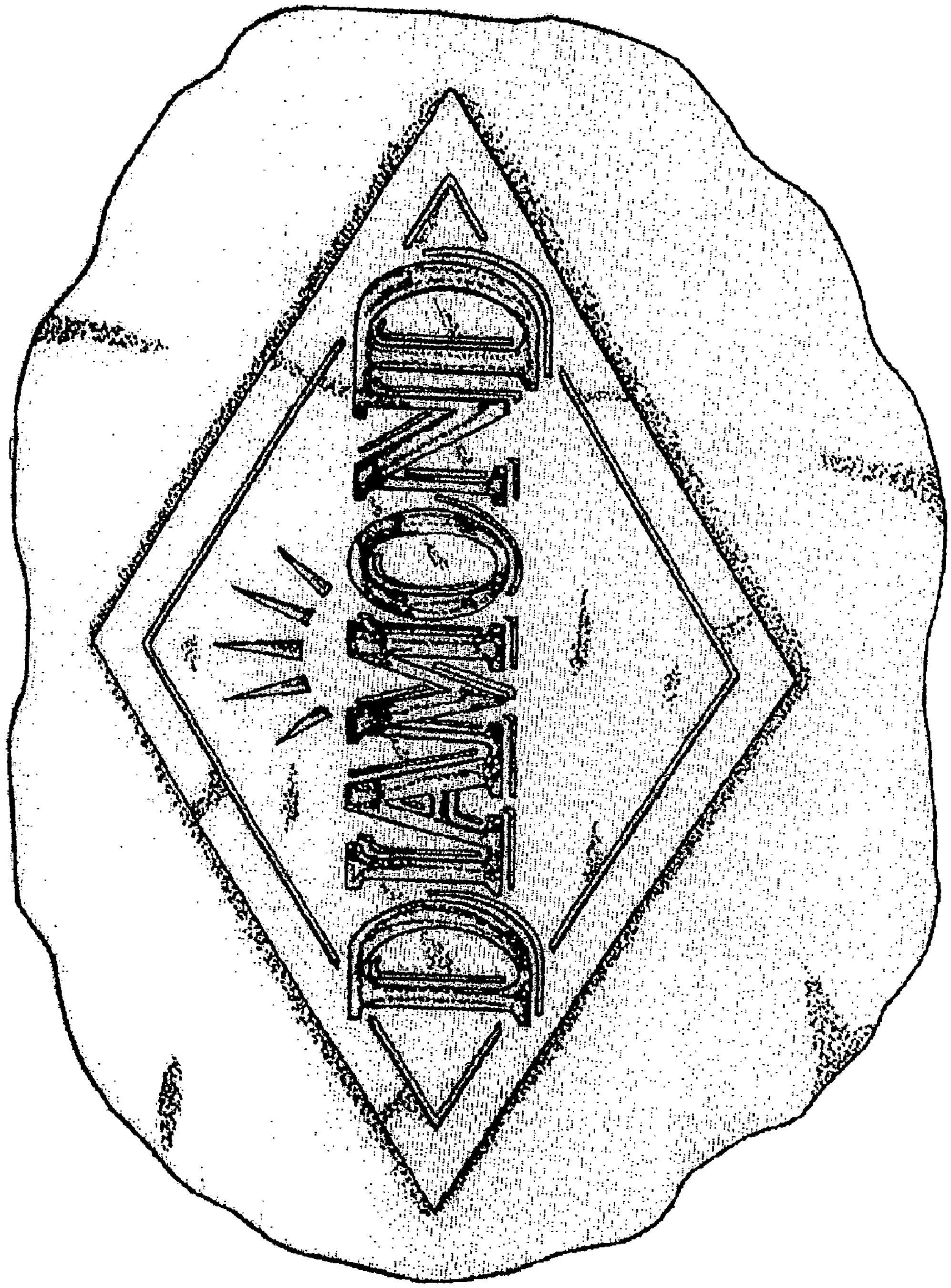
FIG. 6 is an illustration of a sample output from the RF Welding Machine.

Referring again to FIG. 1, the welding components 12 include the die 10. The die 10 is a typical die use for embossing or welding the material 11. FIG. 6, for example, illustrates a sample die having a diamond design about the word "Diamond."

Returning to FIG. 1, the die 10 has a cavity with inner walls and a bottom shape that is exactly like the desired final outward shop of the end product being the compressed product. The die is made of material which is capable of withstanding the required welding and embossing pressures. Typically, the principle component of the die is a steel alloy.

Another welding component 12 is the material 11. Material, which maybe welded or embossed, includes PVC, PET, RPET, PU, urethane and vinyl coated materials and other related sealable materials. The material is adapted to be sealed onto other different or identical materials, a.k.a. appliqué on material and material on material.

The RF welder 6 has power input components 15 which include the generator 9. The generator is a solid state generator being, for example, model CX-1000A, 27.12 MHz by Comdel Corporation, of 11 Kondelin Road, Gloucester, Mass. 01930. The "1000A" stand for 1000 Watts, or 1 KW of power. The amount of power required for a given application is dependent upon type or quantity of material that is subject to the system.

A solid state generator is required as compared to an oscillator tube style generator. The oscillator tube style generator has an extensive swing in load impedance during use which renders the tuner incapable of matching the impedance of the platen to the generator. The solid state generator, on the other hand, is capable of operating at a 100% duty cycle and, notably, is capable of remote operation, i.e. the power supply is capable of being located in a separate room, with the efficiency of the system remaining in a high 90 percent efficiency.

Separating the power supply from the generator is advantageous for medical applications as the power supply portion can be put outside a clean room environment if needed.

Separating the power supply is also advantageous for quality control purposes for allowing a separate control room where the operators of the machines are incapable of changing the setting arbitrarily.

Another benefit of a sold state generator is the efficiency at which the generator is capable of supplying power. Some materials weld better with differing frequencies or respond better to variable frequencies, such as frequencies that ramp downwardly through the welding or embossing process to account for material property changes through the welding process. The physical characteristics of alternating frequencies will be apparent, though unobvious, to those knowledgeable in the art.

The generator 9 provides welding and embossing energy to the system at a frequency of 27.12 MHz. The frequency is set by governmental regulation at 27.12 MHz for RF welding and embossing, and it is to be appreciated that other frequencies could be used where available by law.

The power supplied by the generator depends on the material being processed and the processing to the material. A typical generator for an embosser or welder produces 6 KiloWatts (KW) or more of power. However, wattage both above and below 6 KW could be supplied, where necessary.

The cabling 16 is chosen because it is capable of carrying the current which results and is determined by the RF power supplied by the generator and the impedance of the load without failure due to over-dissipation. The cable is a standard cable for applications in RF Welding and embossing. A sample of the cabling is the type provided with the aforementioned generator by Comdel Corporation. It is to be appreciated that cabling having greater or lesser dissipative characteristics could be employed, where necessary. The power input 15 also includes a transducer 26 that transfers power from the generator to the top plate 13.

Regarding the electrical communication between the impedance matching system 7 and the generator 9, the system has a power regulator 17 which includes the impedance matching system 7 which is connected to the welding components 12 and receives electronic communication from the generator 9 through the coaxial cable 16. The impedance matching system 7 is, for example, model CPM-25, air cooled, single phase, 115 volt, vacuum variable caps by Comdel Corporation, 11 Kondelin Road, Gloucester, Mass. 01930, having power supply number CX 27.12 by Comdel, which is a known impedance matching network.

The system 7 includes an algorithm that gradually slows the adjustment of the matching network capacitors so that precise impedance matching is achieved ensuring that the proper power is delivered to the load during the welding or embossing process. Even with high loads, a matching is capable responsive to the change of material characteristics during the process.

The impedance characteristics of the welding components 12, such as the plates, the die and the material, are based upon the solid structure and material properties of the components. The impedance characteristics differ from one piece of material to another and change throughout the welding or embossing processes in a manor which is known in the art. These changes affect the power being transferred through the system and the power required to be dissipated by the system components.

The impedance matching system 7 is designed to dynamically adjust the impedance that the generator sees so that the power level delivered is controlled and over-dissipation of the cables and other components does not occur. This ensures that the proper power is consistently delivered to the dies and weld. The disclosed stabilizing technology optimizes amplifier (power supply and generator) performance, reducing power-gain changes caused by material and die impedance fluctuations, both dynamic and static.

The power regulator 7 includes cables 25 which are, for example, standard 25 pin peripheral cables adapted to transfer signals indicative of inductance and electrical characteristics of the welding components 12 to the matching system 7 after the top plate 13 is pressed against the bottom plate 14. Signals traveling through the peripheral cables are, for example, digital signals converted from an analog to digital converter (not shown). The a/d converter is connected to receive signals from the system in a manor that is readily apparent to one skilled in the art and analyzed and interpreted by the regulator 7 so that the regulator 7 may determine the electrical state of the system.

Due to the dynamic adjustments of the system 7, manual adjustments are unnecessary and iterations are not required to maintain the desired power characteristics. Accordingly, the matching system 7 accounts for differences in each unique material piece, each unique die, and the changing power characteristics that result during heating.

Figure 5:
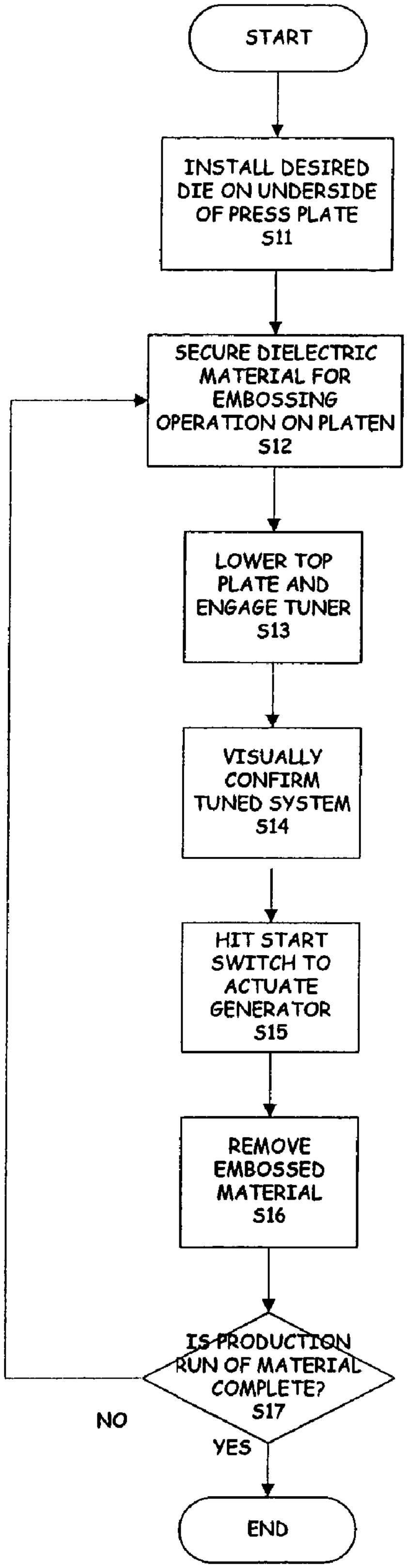
FIG. 5 is a schematic illustration of the method of operating the RF Welding Machine.

Turning now to FIG. 5, the operation of the system is disclosed. The die 10 is installed on the underside of the top press plate 13 at step S11. The material 11 that is the subject of the embossing or welding is secured to the lower plate 14 at step S12. The top plate 13 is lowered onto the bottom plate 14 and the matching system 7 is activated at step S13.

Once the plate is lowered, the matching system 7 reads and, as required, affects the impedance characteristics of the welding components 12. The adjusting prevents more than a 50 ohm load from being dissipated by the cables and enables power to transfer continuously through the die and material at a frequency of 27.12 MHz. Once the characteristics are tuned, the system is capable of indicating readiness with a visual or audible signal at S14. The generator 9 is automatically or manually activated and the matching system 14 dynamically maintains the tuned characteristics throughout the embossing or welding cycle at step S15. Then the material is removed at step S16.

Since the material welding is optimized for each material piece, there is no need to manually re-tune before welding or embossing any individual piece of material. Accordingly, the welding or embossing of the next material pattern can continue at step S17. Alternatively, a new die can be installed and the process can begin again at step S18.

It is to be appreciated that the present invention is much more efficient than the prior art method by not only saving steps, but saving material.

Accordingly, an RF welder has been disclosed that has circuitry that automatically affects the impedance of system so that the generator is capable of transferring power at a predetermined frequency through die and material and a maximum load is capable of being dissipated through system components.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

What is claimed is:

1. An apparatus for performing a process of embossing, sealing, welding or fusing RF sealable material, the apparatus comprising:

a power source including a solid state generator for providing a predetermined power load at a predetermined frequency;

power components operating below a maximum predetermined power load in electronic communication with the generator for transferring power from the generator towards the sealable material;

welding components for receiving the transferred power from the power components and transferring the power to the RF sealable material whereby the material is embossed, sealed, welded or fused;

an automatic impedance tuning device in electronic communication between the power components and the welding components, the tuning device including electronically controlled capacitors; and the automatic tuning device electronically monitoring the electrical state of the apparatus and continuously controlling the capacitors in the tuning device for modifying apparatus impedance throughout the process so that: (1) delivery of said predetermined power remains substantially unchanged and (2) said power load in said power components remains below said maximum predetermined power load.

2. The apparatus of claim 1 wherein the RF sealable material includes leather.

3. An apparatus for performing a process of embossing, sealing, welding or fusing RF sealable material, the apparatus comprising:

a power source including a solid state generator for providing a predetermined power load at a predetermined frequency;

power components operating below a maximum predetermined power load in electronic communication with the generator for transferring power from the generator towards the sealable material;

welding components for receiving the transferred power from the power components and transferring the power to the RF sealable material whereby the material is embossed, sealed, welded or fused;

an automatic impedance tuning device in electronic communication between the power components and the welding components, the tuning device including electronically controlled capacitors;

the automatic tuning device electronically monitoring the electrical state of the apparatus and continuously controlling the capacitors in the tuning device for modifying apparatus impedance throughout the process so that: (1) delivery of said predetermined power remains substantially unchanged and (2) said power load in said power components remains below said maximum predetermined power load; and said power components including coaxial cabling.

4. An apparatus for performing a process of embossing, sealing, welding or fusing RF sealable material, the apparatus comprising:

a power source including a solid state generator for providing a predetermined power load at a predetermined frequency;

power components operating below a maximum predetermined power load in electronic communication with the generator for transferring power from the generator towards the sealable material;

welding components for receiving the transferred power from the power components and transferring the power to the RF sealable material whereby the material is embossed, sealed, welded or fused;

an automatic impedance tuning device in electronic communication between the power components and the welding components, the tuning device including electronically controlled capacitors;

the automatic tuning device electronically monitoring the electrical state of the apparatus and continuously controlling the capacitors in the tuning device for modifying apparatus impedance throughout the process so that: (1) delivery of said predetermined power remains substantially unchanged and (2) said power load in said power components remains below said maximum predetermined power load;

said power components including coaxial cabling; and said welding components including at least one conductive platen wherein the electrical state monitored by the tuning device includes the electrical characteristic of the platen.

5. An apparatus for performing a process of embossing, sealing, welding or fusing RF sealable material, the apparatus comprising:

a power source including a solid state generator for providing a predetermined power load at a predetermined frequency;

power components operating below a maximum predetermined power load in electronic communication with the generator for transferring power from the generator towards the sealable material;

welding components for receiving the transferred power from the power components and transferring the power to the RF sealable material whereby the material is embossed, sealed, welded or fused;

an automatic impedance tuning device in electronic communication between the power components and the welding components, the tuning device including electronically controlled capacitors;

the automatic tuning device electronically monitoring the electrical state of the apparatus and continuously controlling the capacitors in the tuning device for modifying apparatus impedance throughout the process so that: (1) delivery of said predetermined power remains substantially unchanged and (2) said power load in said power components remains below said maximum predetermined power load;

said power components including coaxial cabling; and said welding components including at least one conductive platen and at least one conductive die between said platen and said material wherein the electrical state monitored by the tuning device includes the electrical characteristic of said die.

6. A method of using an apparatus that applied RF power for performing a process defined by embossing, sealing, welding or fusing RF sealable material, the apparatus comprising:

a power source including a solid state generator for providing a predetermined power load at a predetermined frequency;

power components operating below a maximum predetermined power load in electronic communication with the generator for transferring power from the generator towards the sealable material;

welding components for receiving the transferred power from the power components and transferring the power to the RF sealable material whereby the material is embossed, sealed, welded or fused;

an automatic impedance tuning device in electronic communication between the power components and the welding components, the tuning device including electronically controlled capacitors;

the method comprising:

electronically monitoring, by the automatic tuning device, the electrical state of the apparatus; and continuously controlling, by the automatic tuning device, the capacitors in the tuning device for modifying apparatus impedance throughout the process so that: (1) delivery of said predetermined power remains substantially unchanged and (2) said power load in said power components remains below said maximum predetermined power load.

7. A method of using an apparatus that applied RF power for performing a process defined by embossing, sealing, welding or fusing RF sealable material, the apparatus comprising:

a power source including a solid state generator for providing a predetermined power load at a predetermined frequency;

power components operating below a maximum predetermined power load in electronic communication with the generator for transferring power from the generator towards the sealable material;

welding components for receiving the transferred power from the power components and transferring the power to the RF sealable material whereby the material is embossed, sealed, welded or fused;

an automatic impedance tuning device in electronic communication between the power components and the welding components, the tuning device including electronically controlled capacitors;

the method comprising:

electronically monitoring, by the automatic tuning device, the electrical state of the apparatus; and continuously controlling, by the automatic tuning device, the capacitors in the tuning device for modifying apparatus impedance throughout the process so that: (1) delivery of said predetermined power remains substantially unchanged and (2) said power load in said power components remains below said maximum predetermined power load; and said power components including coaxial cabling.

8. A method of using an apparatus that applied RF power for performing a process defined by embossing, sealing, welding or fusing RF sealable material, the apparatus comprising:

a power source including a solid state generator for providing a predetermined power load at a predetermined frequency;

power components operating below a maximum predetermined power load in electronic communication with the generator for transferring power from the generator towards the sealable material;

welding components for receiving the transferred power from the power components and transferring the power to the RF sealable material whereby the material is embossed, sealed, welded or fused;

an automatic impedance tuning device in electronic communication between the power components an the welding components, the tuning device including electronically controlled capacitors;

the method comprising:

electronically monitoring, by the automatic tuning device, the electrical state of the apparatus; and continuously controlling, by the automatic tuning device, the capacitors in the tuning device for modifying apparatus impedance throughout the process so that: (1) delivery of said predetermined power remains substantially unchanged and (2) said power load in said power components remains below said maximum predetermined power load;

said power components include coaxial cabling; and said apparatus including at least one conductive platen wherein the electrical state monitored by the tuning device includes the electrical characteristic of the platen.

9. A method of using an apparatus that applied RF power for performing a process defined by embossing, sealing, welding or fusing RF sealable material, the apparatus comprising:

a power source including a solid state generator for providing a predetermined power load at a predetermined frequency;

power components operating below a maximum predetermined power load in electronic communication with the generator for transferring power from the generator towards the sealable material;

welding components for receiving the transferred power from the power components and transferring the power to the RF sealable material whereby the material is embossed, sealed, welded or fused;

an automatic impedance tuning device in electronic communication between the power components and the welding components, the tuning device including electronically controlled capacitors;

the method comprising:

electronically monitoring, by the automatic tuning device, the electrical state of the apparatus; and continuously controlling, by the automatic tuning device, the capacitors in the tuning device for modifying apparatus impedance throughout the process so that: (1) delivery of said predetermined power remains substantially unchanged and (2) said power load in said power components remains below said maximum predetermined power load;

said power components include coaxial cabling; and said apparatus including at least one conductive platen and at least one conductive die between said platen and said material wherein the electrical state monitored by the tuning device includes the electrical characteristic of said die.

* * * * *